(12) United States Patent
Sivertsen

(10) Patent No.: US 9,292,757 B1
(45) Date of Patent: Mar. 22, 2016

(54) LASER PROJECTION SYSTEM PROJECTING CONTENT BASED ON INFORMATION COLLECTED FROM NEARBY TARGETS

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 59 days.

(21) Appl. No.: 14/048,384

(22) Filed: Oct. 8, 2013

(51) Int. Cl.
  *G06K 9/00* (2006.01)
  *G06K 9/32* (2006.01)
  *G06Q 30/02* (2012.01)

(52) U.S. Cl.
  CPC .......... *G06K 9/3241* (2013.01); *G06Q 30/0261* (2013.01)

(58) Field of Classification Search
  None
  See application file for complete search history.

(56) References Cited

U.S. PATENT DOCUMENTS

| | | | |
|---|---|---|---|
| 2011/0015997 A1* | 1/2011 | Casey et al. | 705/14.49 |
| 2011/0157353 A1* | 6/2011 | Takayama et al. | 348/135 |
| 2011/0298603 A1* | 12/2011 | King et al. | 340/436 |
| 2013/0243247 A1* | 9/2013 | Sakaue et al. | 382/103 |

* cited by examiner

*Primary Examiner* — Weiwen Yang
(74) *Attorney, Agent, or Firm* — Locke Lord LLP; Tim Tingkang Xia, Esq.

(57) ABSTRACT

Certain aspects direct to a laser projection pavertizing system, which includes a camera, a laser projector, and a controller. The camera is configured to capture the image frames of the projection area. When the controller receives image frames from the camera, the controller processes the image frames to detect at least one target existing in the projection area, generates projecting parameters for each of the at least one target, and sends the projecting parameters to the laser projector. Upon receiving the projecting parameters, the laser projector projects a pattern for each of the at least one target on the projection area at a predetermined distance from the at least one target in accordance with the projecting parameters such that the pattern is viewable for the at least one target.

25 Claims, 6 Drawing Sheets

LASER PROJECTION SYSTEM PROJECTING CONTENT BASED ON INFORMATION COLLECTED FROM NEARBY TARGETS

FIELD

The present disclosure generally relates to target action collection and laser pavertizing based on target action, and more particularly to controllers associated with laser projectors and that collect target action information as well as a management system of the laser projectors that utilize the collected target action information.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A laser is a device that emits light through a process of optical amplification based on the stimulated emission of electromagnetic radiation. The spatial coherence of a laser beam allows collimation over long distances. Applications of lasers include, among other things, laser pointers and laser projectors. Laser projectors are projectors that modulate laser beams in order to project an image at a target area. Generally, the laser projectors use a reflective screen at the target area to show the image thereon. Nevertheless, when the target area has a surface with low optical absorbance, the laser projector may project the image directly on the surface without using the screen or any other displaying device. Therefore, the laser projectors may be used to project images on surfaces such as building walls or pavement grounds for advertising purposes. There is a need to attract the pedestrians passing by the laser projecting contents of the advertisements.

Therefore, heretofore unaddressed needs still exist in the art to address the aforementioned deficiencies and inadequacies.

SUMMARY

Certain aspects of the present disclosure directs to a system. The system includes a controller, which includes a processor and a non-volatile memory storing firmware. The firmware, when executed at the processor, is configured to: receive image frames of a projection area, wherein at least one target exists in the projection area; detect the at least one target from the image frames; and generate projecting parameters for each of the at least one target such that, for each of the at least one target, a pattern on the projection area is projectable at a predetermined distance from the at least one target in accordance with the projecting parameters.

In certain embodiments, each of the projecting parameters includes a polar angle θ, and an azimuth angle φ.

In certain embodiments, the firmware, when executed at the processor, is configured to generate the projecting parameters for each of the at least one target by: generating target action data for each of the at least one target according to the image frame, generating projecting location data for each of the at least one target according to the target action data, and generating the projecting parameters for each of the at least one target according to the projecting location data.

In certain embodiments, the target action data includes at least one of target current location, target moving direction, and target speed. In certain embodiments, the projecting location data for each of the at least one target is determined by the predetermined distance from the target current position along the target moving direction.

In certain embodiments, the system further includes: a camera in communication to the controller, configured to capture the image frames of the projection area; and a laser projector in communication to the controller, configured to receive the projecting parameters from the controller, and to project, for each of the at least one target, the pattern on the projection area at the predetermined distance from the at least one target in accordance with the projecting parameters.

In certain embodiments, the firmware includes: a camera control module configured to control the camera to capture the image frames; a video converter configured to convert the image frames to digital image frame data; and a pavertizing module configured to store the digital image frame data to a frame queue, to receive the target action data from an image processing engine, to generate the projecting location data for each of the at least one target according to the target action data, to generate the projecting parameters according to the projecting location data, and to send the projecting parameters to the laser projector. The image processing engine is configured to retrieve the digital image frame data from the frame queue, to generate the target action data according to the digital image frame data, and to send the target action data to the pavertizing module.

In certain embodiments, the pavertizing module includes: an image-processing-engine interface configured to interact with the image processing engine, wherein the processing engine interface is configured to set up configuration of the image processing engine, to send the digital image frame data to the image processing engine, and to receive the target action data from the image processing engine; and a parameter calculation module configured to generate the projecting location data for each of the at least one target according to the target action data, and to generate the projecting parameters according to the projecting location data.

In certain embodiments, the firmware, when executed at the processor, is further configured to: periodically request and receive content data from a content server, generate emission signals according to the content data, wherein the laser projector is configured to emit light according to the emission signals to form the pattern, and send the emission signals and the projecting parameters to the laser projector.

In certain embodiments, the laser projector includes: an emission module configured to receive the emission signals from the controller, and to emit laser beams in response to the emission signals to project the pattern on the projection area; and a projector movement module to receive the projecting parameters from the controller, and to move the emission module in response to the projecting parameters.

In certain embodiments, the firmware includes a content download module configured to periodically request and receive a program list from the content server, to request and receive the content data from the content server according to the program list, to generate the emission signals according to the content data, and to send the emission signals to the laser projector.

In certain embodiments, the content server includes: a content storage module configured to store the content data, and to send the content data to the controller in response to the request for the content data from the controller; and a content manager module configured to generate the program list, and to send the program list to the controller in response to the request for the program list from the controller.

In certain embodiments, the program list includes information specifying the content data and time for the specified content data to be projected by the laser projector.

Certain aspects of the present disclosure direct to a method of performing laser projection pavertizing. In certain embodiments, the method includes: receiving, at a controller, image frames of a projection area, wherein at least one target exists in the projection area; detecting the at least one target from the image frames; generating, at the controller, projecting parameters for each of the at least one target, wherein for each of the at least one target, the projecting parameters corresponds to a pattern on the projection area at a predetermined distance from the at least one target; and sending the projecting parameters from the controller to a laser projector, wherein the laser projector is configured to project the pattern at the predetermined distance from the at least one target in accordance with the projecting parameters.

In certain embodiments, each of the projecting parameters includes a polar angle $\theta$, and an azimuth angle $\phi$.

In certain embodiments, the method further includes: periodically requesting and receiving content data from a content server; generating, at the controller, emission signals according to the content data; and sending the emission signals from the controller to the laser projector, wherein the laser projector is configured to emit light according to the emission signals to form the pattern at the predetermined distance from the at least one target in accordance with the projecting parameters.

In certain embodiments, the projecting parameters are generated by: generating target action data for each of the at least one target according to the image frame, generating projecting location data for each of the at least one target according to the target action data, and generating the projecting parameters for each of the at least one target according to the projecting location data.

In certain embodiments, the target action data includes at least one of target current location, target moving direction, and target speed; and the projecting location data for each of the at least one target is determined by the predetermined distance from the target current position along the target moving direction.

In certain embodiments, the target action data is generated by: controlling a camera to capture the image frames, wherein the camera is in communication to the controller; converting, at the controller, the image frames to digital image frame data; storing the digital image frame data to a frame queue, wherein an image processing engine is configured to retrieve the digital image frame data from the frame queue and to generate the target action data according to the digital image frame data; and receiving, at the controller, the target action data from the image processing engine.

Certain aspects of the present disclosure direct to a non-transitory computer readable medium storing computer executable codes for controlling a laser projection pavertizing system. The codes, when executed at a processor, are configured to: receive image frames of a projection area, wherein at least one target exists in the projection area; detect the at least one target from the image frames; generate projecting parameters for each of the at least one target, wherein for each of the at least one target, the projecting parameters corresponds to a pattern on the projection area at a predetermined distance from the at least one target; and send the projecting parameters from the controller to a laser projector, wherein the laser projector is configured to project the pattern at the predetermined distance from the at least one target in accordance with the projecting parameters.

In certain embodiments, each of the projecting parameters includes a polar angle $\theta$, and an azimuth angle $\phi$.

In certain embodiments, the codes include a content download module configured to: periodically request and receive a program list from a content server, request and receive content data from the content server according to the program list, generate emission signals according to the content data, and send the emission signals to the laser projector, wherein the laser projector is configured to emit light according to the emission signals to form the pattern at the predetermined distance from the at least one target in accordance with the projecting parameters.

In certain embodiments, the projecting parameters for each of the at least one target are generated by: generating target action data for each of the at least one target according to the image frame, generating projecting location data for each of the at least one target according to the target action data, and generating the projecting parameters for each of the at least one target according to the projecting location data.

In certain embodiments, the target action data includes at least one of target current location, target moving direction, and target speed; and the projecting location data for each of the at least one target is determined by the predetermined distance from the target current position along the target moving direction.

In certain embodiments, the codes include: a camera control module configured to control a camera to capture the image frames, wherein the camera is in communication to the controller; a video converter configured to convert the image frames to digital image frame data; and a pavertizing module configured to store the digital image frame data to a frame queue, to receive the target action data from an image processing engine, to generate the projecting location data for each of the at least one target according to the target action data, to generate the projecting parameters according to the projecting location data, and to send the projecting parameters to the laser projector. The image processing engine is configured to retrieve the digital image frame data from the frame queue, to generate the target action data according to the digital image frame data, and to send the target action data to the pavertizing module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
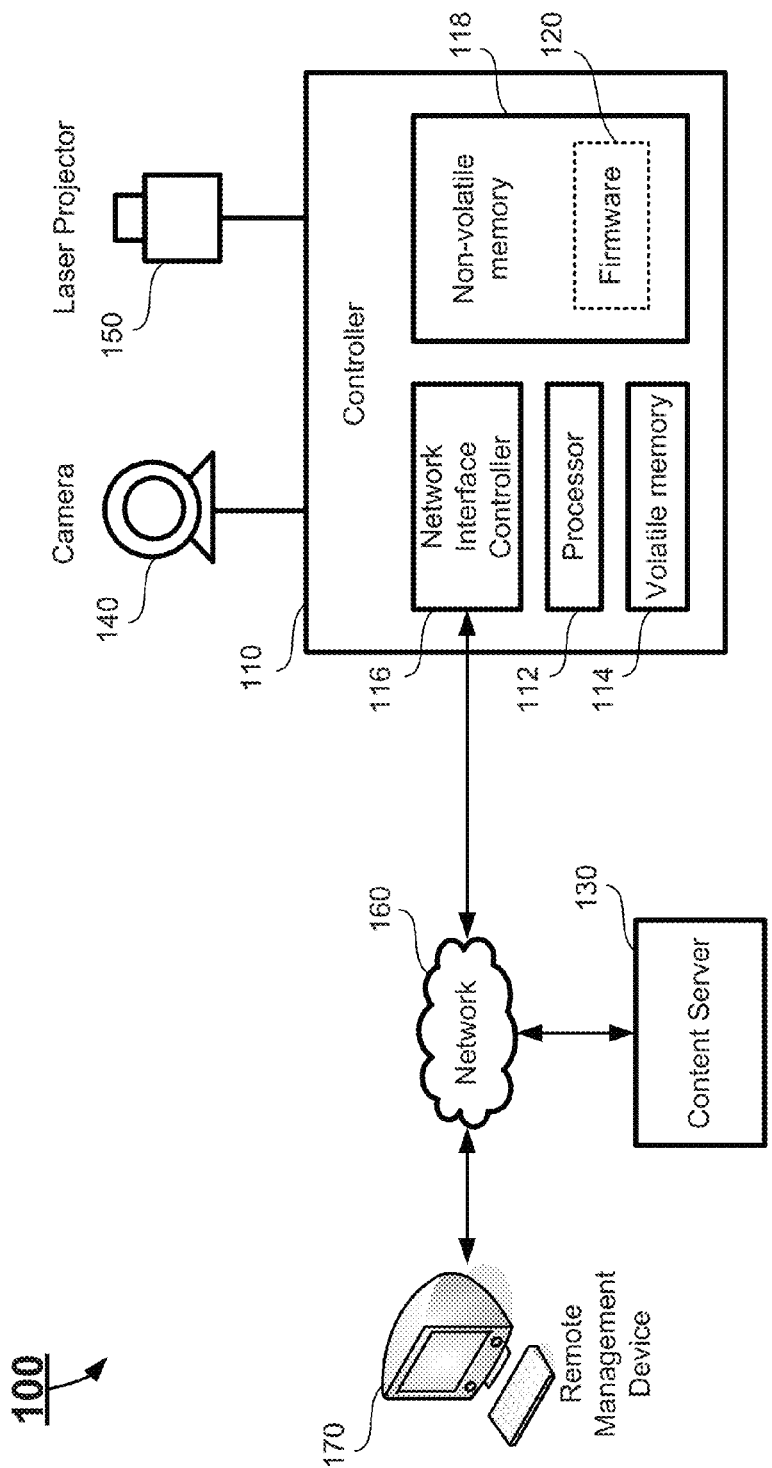
FIG. 1 schematically depicts a laser projection pavertizing system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 schematically depicts a laser projection pavertizing system according to one embodiment of the present disclosure. As used herein, the term "pavertizing" refers to pavement advertising. In other words, pavertizing refers to showing the contents of an advertisement on a pavement or a sidewalk where pedestrians pass by, or on other ground surfaces or walls where pedestrians may see.

As shown in FIG. 1, laser projection pavertizing system 100 includes a controller 110, a content server 130, a camera 140, and a laser projector 150. The camera 140 and the laser projector 150 are connected to and controlled by the controller 110. The content server 130 is connected to the controller 110 via a network 160. Optionally, a remote management device 170 is connected to the controller 110 via the network 160. It should be appreciated that the laser projection pavertizing system 100 as shown of FIG. 1 only represent an exemplary embodiment of the present disclosure, and therefore should not be considered to limit the disclosure in any manner. In certain embodiments, the laser projection pavertizing system 100 may include other physical or virtual components not shown in FIG. 1.

The controller 110 is a controlling device to control the laser projection pavertizing system 100. As shown in FIG. 1, the controller 110 includes a processor 112 for executing instructions, a volatile memory 114, a network interface controller 116, and a non-volatile memory 118. The controller 110 may be a regular computer, a special purpose computer, or a specialized microcontroller capable of being installed in a computer, such as a service processor (SP) or a baseboard management controller (BMC).

The processor 112 is a host processor of the controller 110, controlling operation and executing instructions of the controller 110. The volatile memory 114 is a temporary memory storing information in operation, such as the instructions executed by the processor 112. For example, the volatile memory 114 may be a random-access memory (RAM). In certain embodiments, the volatile memory 114 is in communication to the processor 112 through appropriate buses or interfaces. In certain embodiments, the controller 110 may include more than one processor 112 or more than one volatile memory 114.

The network interface controller 116 is an interface for performing network communications with the network 160. The network interface controller 116 is in communication to the processor 112 through appropriate buses or interfaces. In certain embodiments, the controller 110 may include more than one network interface controller 116 for connecting to different networks.

The non-volatile memory 118 is a persistent memory for storing data and instructions even when not powered. For example, the non-volatile memory 118 can be a flash memory. In certain embodiments, the non-volatile memory 118 is in communication to the processor 112 through appropriate buses or interfaces. In certain embodiments, the controller 110 may include more than one non-volatile memory 118.

As shown in FIG. 1, the non-volatile memory 118 stores firmware 120. The firmware 120 is configured, when executed, to control the camera 140 to capture the image, to interact with an image processing module by sending the captured image to the image processing module and receiving target action data corresponding to the captured image from the image processing module, to process the target action data to generate projecting parameters for the laser projector 150, and to control the laser projector 150 to emit laser beams. Details regarding the target action data will be described below.

Figure 2A:
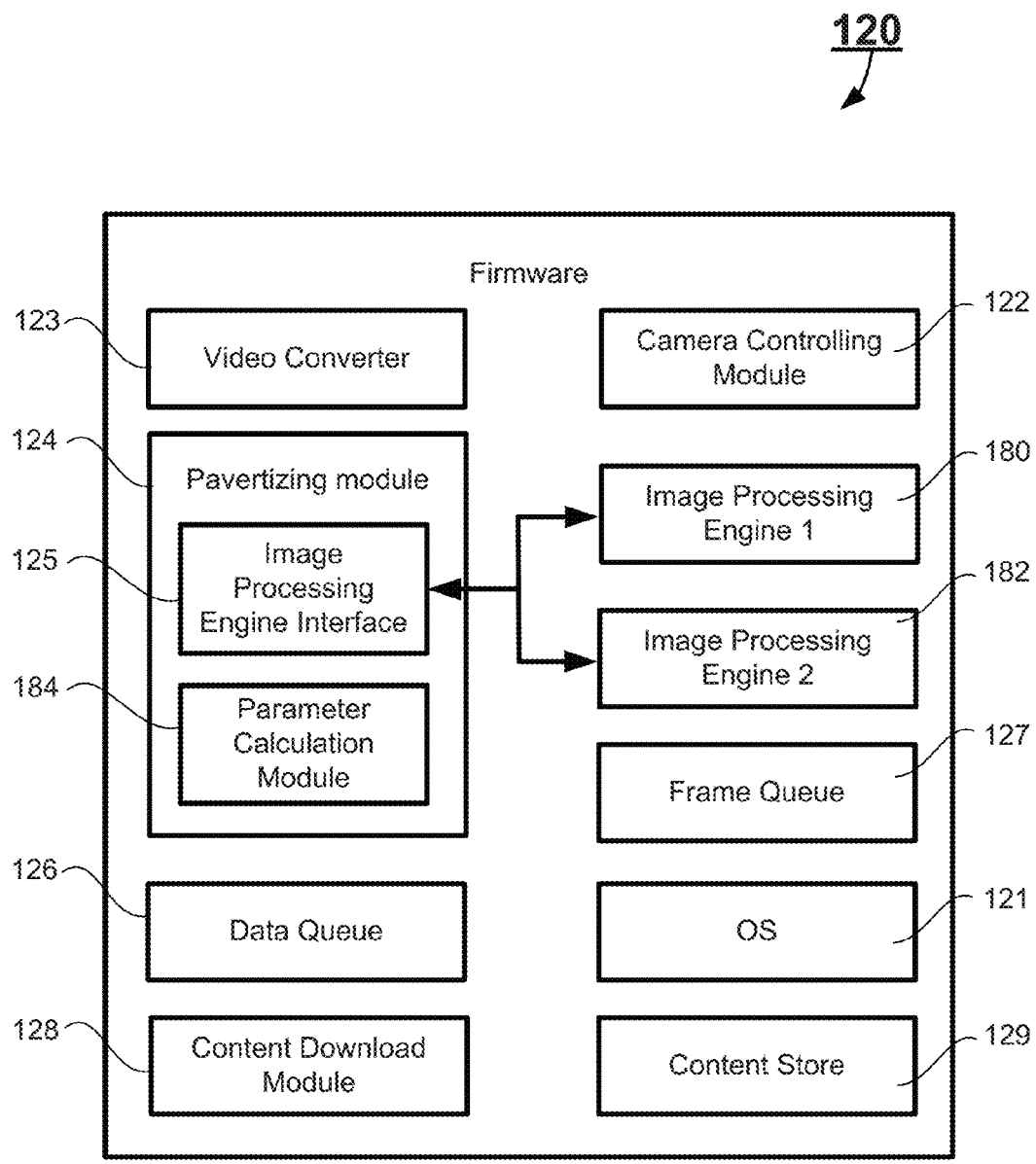
FIG. 2A schematically depicts the firmware of the controller of the laser projection pavertizing system according to one embodiment of the present disclosure.

FIG. 2A schematically depicts the firmware 120 of the controller of the laser projection pavertizing system according to one embodiment of the present disclosure. As shown in FIG. 2A, the firmware 120 of the controller 110 includes an operating system or kernel 121, a camera controlling module 122, a video converter 123, a pavertizing module 124, a data queue 126, a frame queue 127, a content download module 128, a content store 129, and one or more image processing engines 180 and 182. From now on, OS refers to either an operating system or a kernel, unless otherwise noted. In certain embodiments, the firmware 120 may include other components not shown in FIG. 2A.

The OS 121 can be collective management software managing the operation of the controller 110. For example, the OS 121 can include a set of functional programs that control and manage operations of the devices connected to the controller 110, such as the network interface controller 116, the camera 140, and other devices. The set of application programs provide certain utility software for the user to manage the controller 110. For example, the firmware 120 may include a graphical user interface application program such that the user may change the setting of the controller 110 through the graphical user interface. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

The camera controlling module 122 controls the operation of the camera 140. The camera controlling module 122 can instruct the camera 140 when (e.g., through a time schedule) to capture the videos and also set the frame rate for the video (e.g., 30 frames per second). If the camera 140 generates analog video signals, those signals are initially sent to the video converter 123.

The video converter 123 is an analog to digital (A/D) converting module for converting the frames in the analog format to digital image frame data. In certain embodiments, the video converter 123 receives the analog signals of the frames, and converts the analog signals to the digital image frame data. After the A/D conversion, the video converter 123 sends the digital image frame data to the pavertizing module 124.

The frame queue 127 is a frame data store for storing the digital image frame data. The image frames received by the firmware from the digital camera or from the video converter 123 are initially stored in the frame queue 127. As will be described below, the image processing engine can retrieve data for an image frame from the frame queue 127 and then process that frame.

The pavertizing module 124 is a module that can process an image to determine projecting parameters for the laser projector 150. The pavertizing module 124 provides a framework that different image processing engines can be plugged into the pavertizing module 124 depending on the needs. For example, different imaging processing engines may use different algorithms to process an image and, thus, are suitable to generate different type of demographic information or emphasize on different efficiency factors (e.g., speed vs. accuracy). In certain embodiments, the pavertizing module 124 is configured to retrieve an image frame from the frame queue 127 and send the digital image frame data to an image processing engine 180 or 182, to receive the target action data from the image processing engine 180 or 182, and to generate projecting parameters for the laser projector 150 according to the target action data. The pavertizing module 124 initiates one of the image processing engines (for example, the image processing engine 180) for processing the digital image frame data, and sets up the configuration of the image processing engine 180. The pavertizing module 124 then calls the image processing engine 180 to process the current digital image frame data and to generate the target action data. When the image processing engine 180 sends back the target action data, the pavertizing module 124 processes the target action data to generate the projecting parameters for the laser projector 150, and sends the projecting parameters to the laser projector 150.

In certain embodiments, the pavertizing module 124 can provide the common framework for holding an image processing engine through an image-processing-engine interface 125. For example, the image-processing-engine interface 125 is an application programming interface (API). Each of the image processing engines 180 and 182 implements the functions defined by the image-processing-engine interface 125. The pavertizing module 124 understands the image-processing-engine interface 125 and can invoke those implemented functions of an image processing engine once the image processing engine is linked to the pavertizing module 124.

The image-processing-engine interface 125 provides a function that the pavertizing module 124 can use to configure the image processing engine implementing the image-processing-engine interface 125. Through that function, the pavertizing module 124 can configure the types of "targets" and the types of target action it should collect. Generally, a target is an individual person. In certain embodiments, when two or more people move together as a group, a target can be a group target representing the group of people. In certain embodiments, a target can be a specifically defined target with certain personal appearance features. For example, the pavertizing module 124 can configure the image processing engine to collect personal attributes such as gender, age, ethnicity, height, skin color, hair color, hair length, facial hair, weight, static/in motion, accessories, stroller, glasses, beard, tie, brief-case, and suitcase information of each target. In certain embodiments, those configurations can be set up in a configuration file, which will be read by the image processing engine.

In certain embodiments, the image-processing-engine interface provides a function that pavertizing module 124 can use to configure a detection level for attributes of a scene. An image processing engine implementing the image-processing-engine interface can have several different detection levels. For example, it can have 7 levels as follows: 1. No Analysis; 2. Human(s)/No Human(s); 3. Count Humans; 4. Count Humans Static vs. in Motion; 5. Age: kids, youth, adult, senior; 6. Gender; man vs. woman; 7. Advanced; Accessories, stroller, glasses, beard, tie, brief-case, suitcase, etc.

The image processing engine often preprocesses an image frame into features. For example, the image processing engine can run an edge detector on the image frame, and then collect features such as edge direction, edge strength, and offset from a segment center for each segment. Thus, an image frame can be reduced to a collection of features. Based on some of those features, the first image can detect persons in an image frame. Based on some of other features, the image processing engine can further determine the above listed personal attributes of a detected person.

The image-processing-engine interface can provide a function that the pavertizing module 124 can use to configure what features should be collected during preprocessing. The image-processing-engine interface 125 can provide a function that the pavertizing module 124 can use to configure what features should be used to determine a target and the weight (or importance) factors of some or all the features should be applied during the determination process.

In certain embodiments, the image-processing-engine interface can provide a function that the pavertizing module 124 can use to define a category with the image processing engine and to instruct the image processing engine to determine the number of target in that category presented in the image frame currently being processed. For example, the pavertizing module 124 can define four target categories: category individual, category couple (two people), category non-couple (two people), and category group (three or more people). The image processing engine accordingly determines the number of targets in each of the categories presented in the image frame currently being processed.

The image-processing-engine interface defines a function that the pavertizing module 124 can call to pass on an image frame and then in response receive target action data returned from an implementing image processing engine.

The target action data includes data of the target's actions recognized from the image frames. In certain embodiments, the target action data includes the location of the target, moving direction of the target, speed of the target (i.e., m/s, whether the target is walking, running or staying in a position without moving). In general, the target action data can be generated by processing more than one frame. For example, by processing a plurality of image frames, three targets may be identified, including a jogging person who is running along the sidewalk to the north, a person standing at a bus station waiting for a bus, and a couple walking along the sidewalk to the south. For one image frame, the target action data for the jogging person target includes the current location of the person in the frame, the moving direction to the north, and the running speed. The target action data for the couple target includes the current location of the couple in the frame, the moving direction to the south, and the walking speed. The target action data for the standing person target includes the current location of the person in the frame, the moving direction (not moving), and the speed, which is zero since the person is not moving.

In certain embodiments, the pavertizing module 124 can include a parameter calculation module 184 for calculating the projecting parameters according to the target action data. In certain embodiments, the parameter calculation module 184 may generate a plurality of intermediate data in the process of generating the projecting parameters. For example, the parameter calculation module 184 may generate projecting location data for each target according to the target action data. By determining the projecting location, the parameter calculation module 184 may generate the projecting parameters according to the projecting location data.

As discussed above, for each target in the image frames, the target action data may include the location of the target, the moving direction of the target, and the speed of the target. Thus, the parameter calculation module 184 may generate the projecting location data for each target by determining a projecting location in front of the location of the target at a predetermined distance and having a moving speed which is the same as the speed of the target along the moving direction of the target. For example, the projecting location of a moving target may be at a location in front of the current position of the target along the moving direction, and the projecting location moves along the moving direction with the speed of the target. The projecting location of a standing person target, whose speed is zero, may be at a location in front of the current position of the target without moving. In certain embodiments, a fixed distance between the projected location and the predicted position of the target may be predetermined in the configuration of the parameter calculation module 184. In certain embodiments, the distance between the projected location and the predicted position of the target may be determined by the location and the speed of the target.

By determining the projecting location, the parameter calculation module 184 may generate the projecting parameters according to the projecting location data. The projecting parameters relates to adjustment information for the laser projector 150. For example, the projecting parameters may include the movement of the projector movement module 154 of the laser projector 150 and the time of the movement.

Figure 2B:
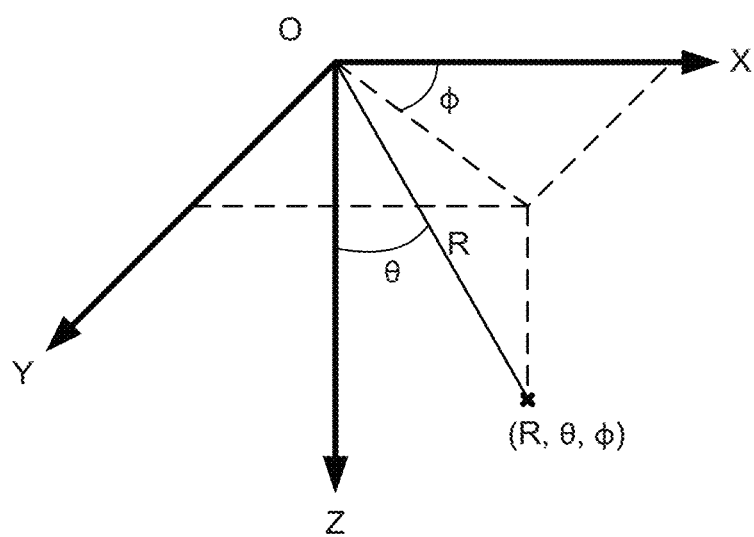
FIG. 2B schematically depicts a spherical coordinate system for determining the projecting parameters according to one embodiment of the present disclosure.

In certain embodiments, the parameter calculation module 184 transfers the projecting location data to the projecting parameters using the concept of a spherical coordinate system. FIG. 2B schematically depicts a spherical coordinate system for determining the projecting parameters according to one embodiment of the present disclosure. As shown in FIG. 2B, a spherical coordinate system is a coordinate system for three-dimensional space where the position of a point (the projecting location for each target) related to a fixed origin O (the laser projector 150) is specified by three numbers (R, θ, φ). R is a radial distance between the point and the fixed origin O, θ is a polar angle of the point measured from a fixed zenith direction, and φ is an azimuth angle of the orthogonal projection of the point on a reference plane that passes through the fixed origin O and is orthogonal to the zenith, measured from a fixed reference direction (axis X) on the reference plane. Thus, for each target, the parameter calculation module 184 may transform the projecting location data to the radial distance R, the polar angle θ, and the azimuth angle φ in the spherical coordinate system, thus generating the projecting parameters.

The data queue 126 is a data store. In one embodiment, the pavertizing module 124 can temporarily store the target action data and the projecting location data generated during the calculation of the projecting parameters in the data queue. In certain embodiments, when the image processing engine sends back the target action data, the pavertizing module 124 may store the target action data in the data queue 126. The pavertizing module 124 then processes with the target action data to generate the projecting location data, and generates the projecting parameters according to the projecting location data. During the processing, the pavertizing module 124 may store the data in the data queue 126.

In certain embodiments, the pavertizing module 124 can directly send the projecting parameters to the projector movement module 154. As will be described below, the projector movement module 154 accordingly adjusts the projecting angle in accordance with the projecting parameters.

The content download module 128 controls downloading of the contents. In certain embodiments, the content download module 128 is configured to request and receive a program list from the content manager module 132 of the content server 130. The content download module 128 then accordingly requests and downloads the contents specified in the program list from the content storage module 134 of the content server 130, and stores the downloaded contents in the content store 129. The content download module 128 then, at the time specified according to the program list, retrieves the content from the content store 129, and processes the content to generate emission signals for the emission module 152 to project the downloaded contents to the projected location. In certain embodiments, the content download module 128 periodically requests the program list from the content manager module 132.

The content store 129 is a data store for storing the contents downloaded by the content download module 128. When the content download module 128 requests and downloads the content from the content server 130, the content download module 128 stores the downloaded contents in the content store 129.

As discussed above, the pavertizing module 124 can use an image processing engine 180 or 182 that implements the functions of the image-processing-engine interface.

Once receiving an image frame from the pavertizing module 124, the image processing engine 180 or 182 can preprocess the image frame to obtain default features (such as corner, line, edge, and center-surrounded features) or features as configured by the pavertizing module 124.

The image processing engine can use various techniques to process those features in order to detect persons in the image frame as well as the personal attributes of each person. For example, based on the needs, the image processing engine can use one or more of a naïve/normal classifier, binary decision trees, boosting techniques, random trees, a Haar classifier, and a Viola-Jones classifier. The image processing engine can adjust the weight/importance factors of some or all of the features and according to which the features are evaluated by the image processing engine to detect different attributes.

Thus, after processing each of the image frame received, the image processing engine can detect how many people appear in the image frame and the personal attributes of each of the people. Based on a default detection level or the detection level configured by the pavertizing module 124, the detected personal attributes can include one or more of gender, age, ethnicity, height, skin color, hair color, hair length, facial hair, weight, static/in motion, accessories, stroller, glasses, beard, tie, brief-case, and suitcase information.

Further, in certain embodiments, the image processing engine may group one or more persons in a default category or a category configured by demographic information collector. For example, the image processing engine can examine the personal attributes of each person and determine which category that person should be assigned to. Thus, the first ending can determine the number of people in each category. The image processing engine can also use other techniques such as a k-means cluster.

In certain embodiments, the image processing engine can temporarily save each received image frame to a queue. In addition to processing the currently received image frame to generate target action data as discussed above, the image processing engine can process the current image frame as well as several previously received image frames (now saved in the queue) together or with reference to the previously received image frames. Those image frames may or may not be consecutive image frames. By using features generated from several frames at different times, the image processing engine can trace a target's action or movement as well as the duration of a target at the scene. In other words, the image processing engine can determine whether the same target appeared in several different frames captured at different times. When a target includes two more or more people, the image processing engine can determine whether the people remain in the same target, or act in different ways to split into multiple new targets.

Then, the image processing engine can use those detected information to construct a target action data structure. For example, the target action data structure can be a JSON object. In this example, the target action data structure can include the location of the target, moving direction of the target, speed of the target (i.e., m/s, whether the target is walking, running or staying in a position without moving). Optionally, the target action may include other information such as the number of people of the target detected, and the personal attributes of each of the detected person in the target. Further, for the target including two or more people, the target action data structure can also include how long the target is formed (meaning the people in the target gather and move as a group).

Figure 3A:
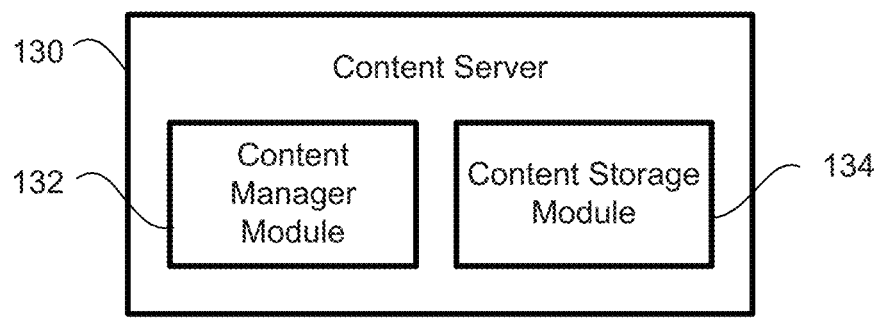
FIG. 3A schematically depicts the content server according to one embodiment of the present disclosure.

The content server 130 manages and stores contents to be delivered to the laser projector 150. FIG. 3A schematically depicts the content server according to one embodiment of the present disclosure. As shown in FIG. 3A, the content server 130 can include a content manager module 132 and a content storage module 134. The content manager module 132 manages the contents (e.g. various advertisement videos) to be projected by the laser projector 150. For example, the content manager module 132 can create a program list for each laser projector 150 and deliver the program list to the laser projector 150. The program list can specify the time for a specific content to be projected by the laser projector 150. The specific content can be identified by a content ID. The program list can also include metadata describing the content specified in the program list. For example, the metadata can describe the category of advertisement content, the format of the content, the length of the content, and the product in the advertisement. The content manager module 132 can also provide a content address (e.g., a uniform resource identifier) for each specific content (e.g. also via the program list). When the content download module 128 of the controller 110 requests the program list, the content manager module 132 sends the program list in response to the request. Using the content address in the program list, the content download module 128 can request and download the specific content from the content storage module 134. In this way, the content download module 128 can download the contents specified in the program list.

The content storage module 134 is a data store for storing of the contents to be delivered to the laser projector 150. In certain embodiments, the format of the contents can be pre-processed for projection by the laser projector 150. For example, the resolution of high-definition image or video contents may be reduced to proper resolution such that the laser projector 150 can process the images or video contents. In certain embodiments, the content storage module 134 can use a mechanism that returns the content data based on a content ID in a request.

The camera 140 is an image capturing device for capturing image of the projection area where the targets pass by. In certain embodiments, the images captured by the camera 140 are in the format of analog video, which includes one or more image frames. In certain embodiments, the camera 140 can directly generate digital image frames. To capture the image, the camera 140 is positioned at a position where the image captured may cover the projection area without obstruction. In certain embodiments, the laser projection pavertizing system 100 may include more than one camera 140. The camera 140 can be connected to a USB connector of the controller 110 and, therefore, transmit the images either in digital format or in analog format to the controller 110.

Figure 3B:
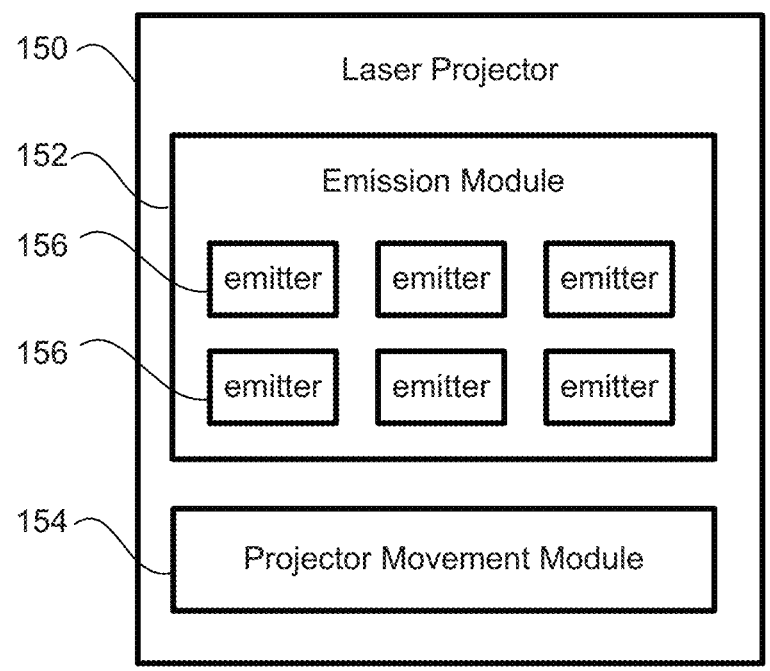
FIG. 3B schematically depicts the laser projector according to one embodiment of the present disclosure.

The laser projector 150 is a content projecting device for displaying digital media content data to the targets. In certain embodiment, the laser projector 150 is positioned at a position where the projecting area of the laser projector 150 may cover the target passing area without obstruction. FIG. 3B schematically depicts a laser projector according to one embodiment of the present disclosure. As shown in FIG. 3B, the laser projector 150 includes an emission module 152 and a projector movement module 154. In certain embodiments, the laser projection pavertizing system 100 may include more than one laser projector 150.

The emission module 152 is an emitting device for emitting laser beams toward a projection area where the targets exist. When the emission module 152 receives the emission signals from the controller 110, the emission module 152 controls the emission module 152 to emit laser beams at the specific emission time. The color and the beam power of the laser beams may be predetermined. In certain embodiments, the laser projector 150 may include more than one emission module 152.

As shown in FIG. 3B, to cover the whole projection area, the emission module 152 may include a plurality of emitters 156. When the emission module 152 receives the emission signals from the controller 110, the emission module 152 controls each emitter 156 to emit laser beams at the specific emission time. In certain embodiments, the emitters 156 may be arranged in an array or a matrix. Each emitter 156 may be in charge of emitting laser beams toward a certain part of the projection area. Thus, as long as a target moves within the projection area, the emitters 156 may project the laser beams to form the advertisement in front of the target.

In certain embodiments, the system may include multiple laser projectors 150. The multiple laser projectors 150 can be arranged, for example, in a matrix or other suitable form in order to cover a large area. For a moving target, the parameter calculation module 184 can calculate projecting parameters for each of the projectors 150. Therefore, the projectors can act in concert to continuously project an image (e.g. an advertisement) in front of the moving target throughout the larger area.

The projector movement module 154 is an adjusting module for adjusting the emission module 152 according to the projecting parameters. In certain embodiments, the projector movement module 154 changes the projecting directions and angles of the emission module 152 at the predetermined time according to the projecting parameters.

The remote management device 170 is a computing device for remote managing the controller 110. A user may remotely connect to the controller 110 from the remote management device 170 to change the settings of the controller 110. In certain embodiments, the remote management device 170 may be a regular computer or a special purpose computer with wired or wireless network connectivity, such as a desktop computer or a laptop computer, or a mobile communication device, such as a smart phone or a tablet computer with wireless network connectivity.

The network 160 is a communication network connecting the controller 110, the content server 130, the laser projector 150, and the remote management device 170. In certain embodiments, the network 160 may include wired or wireless network, and may be in the form of a mobile communication network, the Internet, the local area network (LAN), the wide area network (WAN), or a personal area network (PAN). The mobile communication network is a radio network system distributed over land areas called cells, and generally includes GSM, GPRS, HSPA, CDMA, WCDMA, WiMAX, LTE, satellite communication and many other mobile network systems. The PAN is a computer network system used for communication among computerized devices, which includes Wi-Fi, Zigbee, and Bluetooth networks. In certain embodiments, the network 160 is a cloud network.

Figure 4:
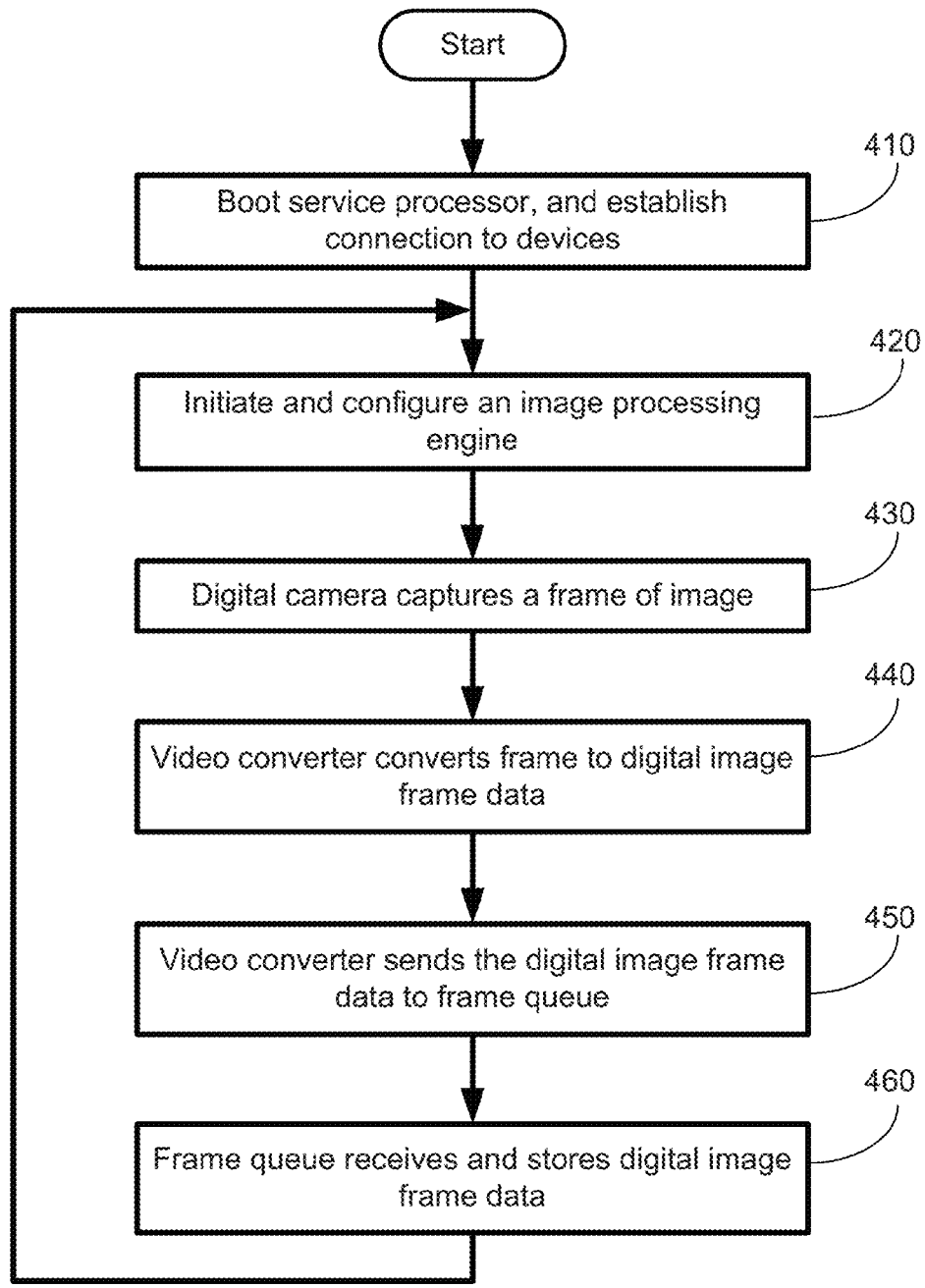
FIG. 4 shows an exemplary flow chart of a controller capturing image frames according to one embodiment of the present disclosure.

FIG. 4 shows an exemplary flow chart of the controller capturing the image and generating the digital image frame data according to one embodiment of the present disclosure.

At operation 410, the controller 110 is booted, and the firmware 120 is launched to establish connection to the devices, including the camera 140 and the network 160. The controller 110 launches the camera controlling module 122, the video converter 123 and the pavertizing module 124. In certain embodiments, a user may remotely access the controller 110 from the remote management device 170 via the network 160.

At operation 420, the image-processing-engine interface 125 of the pavertizing module 124 initiates one of the image processing engines (for example, the image processing engine 180), and sets up the configuration of the image processing engine 180.

At operation 430, the camera controlling module 122 of the controller 110 controls the camera 140 to capture an image frame. The image frame may include the targets and other background images around the targets.

Then, at operation 440, the video converter 123 of the controller 110 converts the captured frame to digital image frame data. At operation 450, the video converter 123 sends the converted digital image frame data to the frame queue 127. At operation 460, the frame queue 127 receives and stores the digital image frame data.

Figure 5:
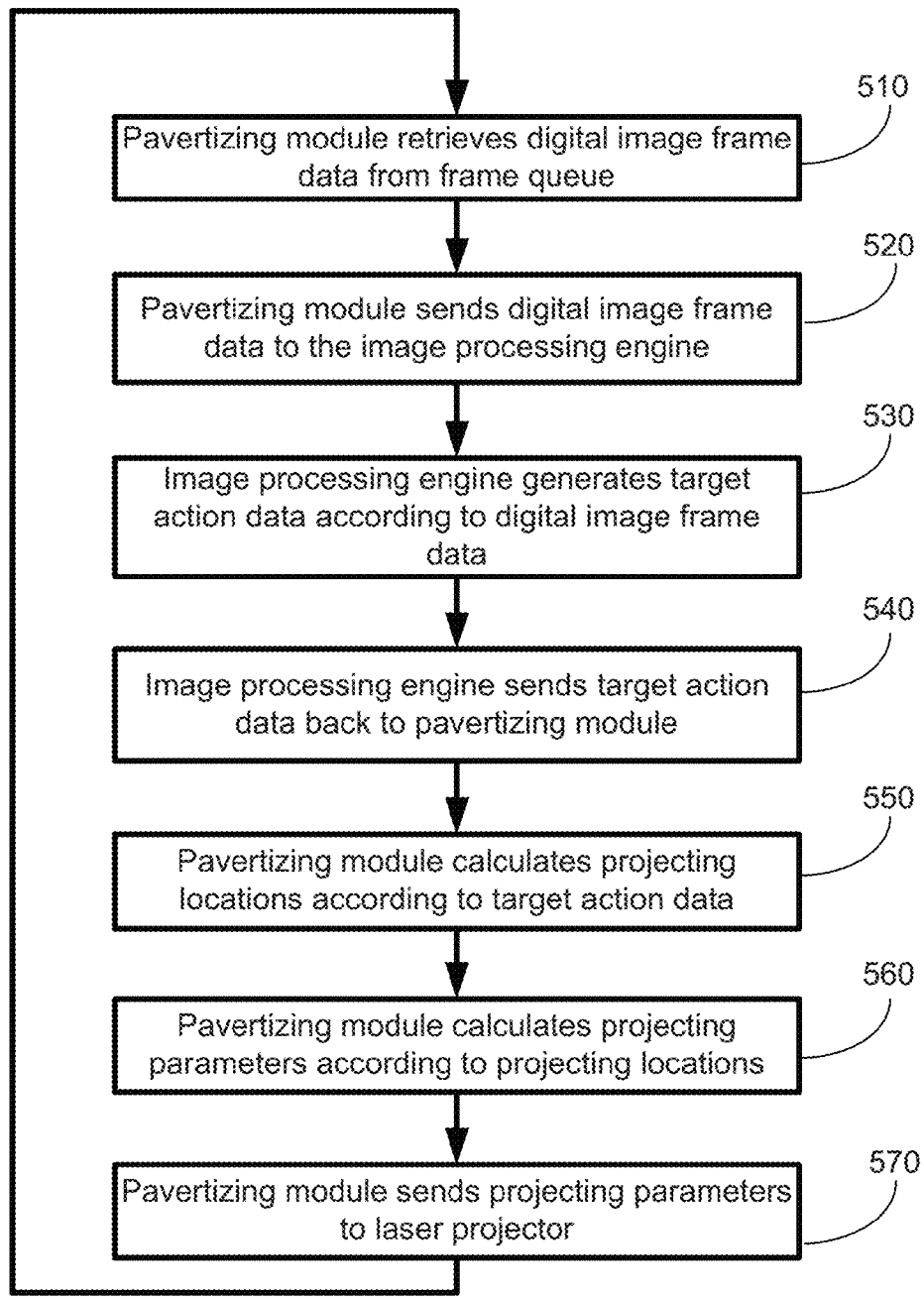
FIG. 5 shows an exemplary flow chart of a controller processing the digital image frame data to generate the projecting parameters according to one embodiment of the present disclosure.

FIG. 5 shows an exemplary flow chart of the controller processing the digital image frame data to generate the projecting parameters according to one embodiment of the present disclosure.

At operation 510, the pavertizing module 124 of the controller 110 retrieves the digital image frame data of a frame from the frame queue 127. At operation 520, the pavertizing module 124 sends the retrieved digital image frame data to the image processing engine 180 for processing. At operation 530, the image processing engine 180 processes the digital image frame data and generates target action data according to digital image frame data.

At operation 540, the image processing engine 180 sends back the target action data back to the pavertizing module 124. Upon receiving the target action data, the pavertizing module 124 may store the target action data in the data queue 126.

At operation 550, the parameter calculation module 184 of the pavertizing module 124 calculates the projecting locations for each target according to the target action data. In certain embodiments, the pavertizing module 124 may store the projecting locations for each target in the data queue 126.

At operation 560, the parameter calculation module 184 of the pavertizing module 124 calculates the projecting parameters according to the projecting locations for each target. Then, at operation 580, the pavertizing module 124 sends the projecting parameters to the laser projector 150.

On the content server 130 side, the content manager module 132 can choose a content stored in the content storage module 134 for a specific time period, and determine a program list for the controller 110. As described above, the content download module 128 of the controller 110 periodically requests the program list from the content server 130. When the content manager module 132 receives the request for the program list, the content manager module 132 sends the program list to the content download module 128. Upon receiving the program list, the content download module 128 may then request and download the contents specified in the program list from the content storage module 134. After downloading the contents, the content download module 128 stores the contents in the content store 129, and processes the contents to generate the emission signals for the laser projector 150.

On the laser projector 150 side, the projector movement module 154 receives the projecting parameters from the pavertizing module 124 of the controller 110, and adjusts the projecting direction and angle of the emission module 152 according to the projecting parameters. The emission module 152 receives the emission signals from the content download module 128 of the controller 110, and, at the emission time specified by the emission signals, emits laser beams toward the projected locations for each target.

The foregoing description of the example of the digital media management software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A laser projection system, comprising:
    a controller, comprising a processor and a non-volatile memory storing a firmware, and
    a laser projector in communication to the controller;
    wherein the firmware, when executed at the processor, is configured to
        receive image frames of a projection area, wherein at least one target exists in the projection area;
        detect the at least one target from the image frames;
        generate projecting parameters based on the image frames for each of the at least one target, wherein for each of the at least one target, a pattern of a digital media content is projectable on the projection area at a predetermined distance from the at least one target in accordance with the projecting parameters based on the image frames; and
        in response to generating the projecting parameters based on the image frames, send the projecting parameters based on the image frames from the controller to the laser projector, wherein the laser projector is configured to project the pattern of the digital media content at the predetermined distance from the at least one target in accordance with the projecting parameters based on the image frames, such that the pattern being projected is viewable by the at least one target to pavertize the digital media content for the at least one target.

2. The system as claimed in claim 1, wherein each of the projecting parameters comprises a polar angle $\theta$ and an azimuth angle $\phi$.

3. The system as claimed in claim 1, wherein the firmware, when executed at the processor, is configured to generate the projecting parameters for each of the at least one target by
    generating target action data for each of the at least one target according to the image frame,
    generating projecting location data for each of the at least one target according to the target action data, and
    generating the projecting parameters for each of the at least one target according to the projecting location data.

4. The system as claimed in claim 3, wherein the target action data comprises at least one of target current location, target moving direction, and target speed.

5. The system as claimed in claim 4, wherein the projecting location data for each of the at least one target is determined by the predetermined distance from the target current position along the target moving direction.

6. The system as claimed in claim 3, further comprising:
    a camera in communication to the controller, configured to capture the image frames of the projection area.

7. The system as claimed in claim 6, wherein the firmware comprises:
    a camera control module configured to control the camera to capture the image frames;
    a video converter configured to convert the image frames to digital image frame data; and a pavertizing module configured to store the digital image frame data to a frame queue, to receive the target action data from an image processing engine, to generate the projecting location data for each of the at least one target according to the target action data, to generate the projecting parameters according to the projecting location data, and to send the projecting parameters to the laser projector;

wherein the image processing engine is configured to retrieve the digital image frame data from the frame queue, to generate the target action data according to the digital image frame data, and to send the target action data to the pavertizing module.

8. The system as claimed in claim 7, wherein the pavertizing module comprises:
an image-processing-engine interface configured to interact with the image processing engine, wherein the processing engine interface is configured to set up configuration of the image processing engine, to send the digital image frame data to the image processing engine, and to receive the target action data from the image processing engine; and
a parameter calculation module configured to generate the projecting location data for each of the at least one target according to the target action data, and to generate the projecting parameters according to the projecting location data.

9. The system as claimed in claim 6, wherein the firmware, when executed at the processor, is further configured to
periodically request and receive content data of the digital media content from a content server,
generate emission signals according to the content data of the digital media content, wherein the laser projector is configured to emit light according to the emission signals to form the pattern of the digital media content, and
send the emission signals and the projecting parameters to the laser projector.

10. The system as claimed in claim 9, wherein the laser projector comprises:
an emission module configured to receive the emission signals from the controller, and to emit laser beams in response to the emission signals to project the pattern on the projection area; and
a projector movement module to receive the projecting parameters from the controller, and to move the emission module in response to the projecting parameters.

11. The system as claimed in claim 9, wherein the firmware comprises:
a content download module configured to periodically request and receive a program list from the content server, to request and receive the content data from the content server according to the program list, to generate the emission signals according to the content data, and to send the emission signals to the laser projector.

12. The system as claimed in claim 11, wherein the content server comprises:
a content storage module configured to store the content data, and to send the content data to the controller in response to the request for the content data from the controller; and
a content manager module configured to generate the program list, and to send the program list to the controller in response to the request for the program list from the controller.

13. The system as claimed in claim 11, wherein the program list comprises information specifying the content data and time for the specified content data to be projected by the laser projector.

14. A method of performing laser projection pavertizing, comprising:
receiving, at a controller, image frames of a projection area, wherein at least one target exists in the projection area;
detecting the at least one target from the image frames;
generating, at the controller, projecting parameters based on the image frames for each of the at least one target, wherein for each of the at least one target, a pattern of a digital media content is projectable on the projection area at a predetermined distance from the at least one target in accordance with the projecting parameters based on the image frames; and
in response to generating the projecting parameters based on the image frames, sending the projecting parameters based on the image frames from the controller to a laser projector, wherein the laser projector is configured to project the pattern of the digital media content at the predetermined distance from the at least one target in accordance with the projecting parameters based on the image frames, such that the pattern being projected is viewable by the at least one target to pavertize the digital media content for the at least one target.

15. The method as claimed in claim 14, wherein each of the projecting parameters comprises a polar angle $\theta$, and an azimuth angle $\phi$.

16. The method as claimed in claim 14, further comprising:
periodically requesting and receiving content data of the digital media content from a content server;
generating, at the controller, emission signals according to the content data of the digital media content; and
sending the emission signals from the controller to the laser projector, wherein the laser projector is configured to emit light according to the emission signals to form the pattern of the digital media content at the predetermined distance from the at least one target in accordance with the projecting parameters.

17. The method as claimed in claim 14, wherein the projecting parameters are generated by:
generating target action data for each of the at least one target according to the image frame,
generating projecting location data for each of the at least one target according to the target action data, and
generating the projecting parameters for each of the at least one target according to the projecting location data.

18. The method as claimed in claim 17, wherein
the target action data comprises at least one of target current location, target moving direction, and target speed; and
the projecting location data for each of the at least one target is determined by the predetermined distance from the target current position along the target moving direction.

19. The method as claimed in claim 17, wherein the target action data is generated by:
controlling a camera to capture the image frames, wherein the camera is in communication to the controller;
converting, at the controller, the image frames to digital image frame data;
storing the digital image frame data to a frame queue, wherein an image processing engine is configured to retrieve the digital image frame data from the frame queue and to generate the target action data according to the digital image frame data; and receiving, at the controller, the target action data from the image processing engine.

20. A non-transitory computer readable medium storing computer executable codes for controlling a laser projection pavertizing system, wherein the codes, when executed at a processor, are configured to receive image frames of a projection area, wherein at least one target exists in the projection area;

detect the at least one target from the image frames;

generate projecting parameters based on the image frames for each of the at least one target, wherein for each of the at least one target, the projecting parameters based on the image frames corresponds to a pattern of a digital media content is projectable on the projection area at a predetermined distance from the at least one target in accordance with the projecting parameters based on the image frames; and in response to generating the projecting parameters based on the image frames, send the projecting parameters based on the image frames from the controller to a laser projector, wherein the laser projector is configured to project the pattern of the digital media content at the predetermined distance from the at least one target in accordance with the projecting parameters based on the image frames, such that the pattern being projected is viewable by the at least one target to pavertize the digital media content for the at least one target.

21. The non-transitory computer readable medium as claimed in claim 20, wherein each of the projecting parameters comprises a polar angle θ, and an azimuth angle φ.

22. The non-transitory computer readable medium as claimed in claim 20, wherein the codes comprise a content download module configured to periodically request and receive a program list from a content server, request and receive content data of the digital media content from the content server according to the program list, generate emission signals according to the content data of the digital media content, and send the emission signals to the laser projector, wherein the laser projector is configured to emit light according to the emission signals to form the pattern of the digital media content at the predetermined distance from the at least one target in accordance with the projecting parameters.

23. The non-transitory computer readable medium as claimed in claim 20, wherein the projecting parameters for each of the at least one target are generated by generating target action data for each of the at least one target according to the image frame, generating projecting location data for each of the at least one target according to the target action data, and generating the projecting parameters for each of the at least one target according to the projecting location data.

24. The non-transitory computer readable medium as claimed in claim 23, wherein the target action data comprises at least one of target current location, target moving direction, and target speed; and the projecting location data for each of the at least one target is determined by the predetermined distance from the target current position along the target moving direction.

25. The non-transitory computer readable medium as claimed in claim 23, wherein the codes comprise:

a camera control module configured to control a camera to capture the image frames, wherein the camera is in communication to the controller;

a video converter configured to convert the image frames to digital image frame data; and a pavertizing module configured to store the digital image frame data to a frame queue, to receive the target action data from an image processing engine, to generate the projecting location data for each of the at least one target according to the target action data, to generate the projecting parameters according to the projecting location data, and to send the projecting parameters to the laser projector;

wherein the image processing engine is configured to retrieve the digital image frame data from the frame queue, to generate the target action data according to the digital image frame data, and to send the target action data to the pavertizing module.

* * * * *